United States Patent [19]

Tsukada et al.

[11] Patent Number: 5,182,072

[45] Date of Patent: Jan. 26, 1993

[54] PROCESS FOR PRODUCING A MODIFIED ETHYLENE/VINYL ACETATE COPOLYMER

[75] Inventors: Kiroku Tsukada; Kunio Kotani, both of Yokohama, Japan

[73] Assignee: Nippon Unicar Company Limited, Danbury, Conn.

[21] Appl. No.: 787,134

[22] Filed: Nov. 4, 1991

[30] Foreign Application Priority Data

Oct. 29, 1990 [JP] Japan .................. 2-288379

[51] Int. Cl.$^5$ ............................................. B29C 47/36
[52] U.S. Cl. ................................. 264/349; 264/564; 264/211.23; 264/211; 264/331.11; 525/100
[58] Field of Search ............ 264/349, 300, 211, 210.6, 264/176.1, 331.11, 564, 211.23; 525/100

[56] References Cited

U.S. PATENT DOCUMENTS

| | | | |
|---|---|---|---|
| 3,779,785 | 12/1973 | Stiles et al. | 117/4 |
| 3,865,897 | 2/1975 | Falender et al. | 525/100 |
| 4,183,882 | 1/1980 | Weinberg et al. | 264/564 |
| 4,472,556 | 9/1984 | Lipowitz et al. | 264/210.6 |
| 4,487,858 | 12/1984 | Lovgren et al. | 264/211 |
| 4,515,745 | 5/1985 | Churma et al. | 264/564 |
| 4,540,538 | 9/1985 | Corwin et al. | 264/300 |
| 4,713,282 | 12/1987 | Yazaki et al. | 264/176.1 |
| 4,921,670 | 5/1990 | Dallmann et al. | 264/210.6 |

FOREIGN PATENT DOCUMENTS

| | | | |
|---|---|---|---|
| 55-51537 | 4/1980 | Japan | 264/210.6 |
| 56-67209 | 6/1981 | Japan | 264/300 |

OTHER PUBLICATIONS

WO89/05328 Jun. 1989 Schwicker et al. pp. 1-11.

*Primary Examiner*—Jeffery Thurlow
*Attorney, Agent, or Firm*—Saul R. Bresch

[57] ABSTRACT

A process involving mixing an ethylene/vinyl acetate copolymer and an organopolysiloxane at a temperature of at least 160° C. for a sufficient length of time to provide a melt index of 0.05 to 8 grams per 10 minutes.

8 Claims, No Drawings

PROCESS FOR PRODUCING A MODIFIED ETHYLENE/VINYL ACETATE COPOLYMER

TECHNICAL FIELD

This invention relates to a process for producing an improved ethylene/vinyl acetate copolymer having a reduced vinyl acetate content.

BACKGROUND INFORMATION

It is known that an ethylene/vinyl acetate copolymer (EVA) having a vinyl acetate content of 0.5 to 30 percent by weight has both thermoplastic and elastomeric properties and that EVA having a vinyl acetate content of 30 to 80 percent by weight has rubber-like properties. The former is used, for example, in extrusion molding, blow molding, injection molding, calendering, and foaming while the latter is used, for example, in synthetic rubber, in grafting or blending, as a plastic modifier, and in hot-melt adhesives.

As the vinyl acetate content increases, the flexibility, especially the low temperature flexibility, and the loading of inorganic fillers are both improved. On the other hand, the strength and heat resistance deteriorate with the result that the melt index becomes very high. This increases the tackiness and blocking, which, in turn, lowers the workability of the copolymer and the mold and roll releasability. Further, the copolymer pellets or powder tend to mass.

Thus, the EVA with a vinyl acetate content of 30 percent by weight or higher is unsuitable for extrusion and is unusable in extrusion molding.

To counter this disadvantage, organic peroxides have been added to the EVA with high vinyl acetate content. The EVA is then heat kneaded to lower the melt index. Unfortunately, this leads to the formation of high molecular weight components, which results in film of poor appearance because of high gel levels.

DISCLOSURE OF THE INVENTION

An object of this invention, therefore, is to provide an EVA, which overcomes the disadvantages of high vinyl acetate content and provides superior low temperature flexibility, blocking resistance, and workability.

Other objects and advantages will become apparent hereinafter.

According to the invention, a process has been discovered for the production of a modified EVA with a high vinyl acetate content comprising mixing:

(i) a copolymer of ethylene and vinyl acetate containing about 20 to about 50 percent by weight vinyl acetate based on the weight of the copolymer; and, for each 100 parts by weight of copolymer, (ii) about 0.1 to about 10 parts by weight of an organopolysiloxane having a viscosity of at least about 10 centistokes at 23° C.; and, optionally, (iii) about 0.001 to about 1 part by weight of an organic peroxide at a temperature of at least about 160° C. for a sufficient length of time to provide the mixture with a melt index of about 0.05 to about 8.0 grams per 10 minutes.

DETAILED DESCRIPTION

The modified EVA prepared by the process of this invention is suitable for use in products such as packaging materials, agricultural films, automobile parts, sheets for civil engineering, hoses, tubes, packing, and foams.

The melt index of the EVA used in the process is preferably below 100 grams per 10 minutes to facilitate heat-kneading, which is simply mixing in a heated environment.

The organopolysiloxane can contain unsaturated or saturated aliphatic groups and aromatic groups. These groups are exemplified by vinyl, allyl, acryl, methacryl, methyl, ethyl, propyl, phenyl, tolyl, cyclohexyl and cyclobutyl. The organopolysiloxane can also contain radicals such as halogen, cyano, and mercapto. The groups or radicals can be the same or different, and the molecular structure of the organopolysiloxane can be linear or cyclic and can contain straight or branched chains. A linear structure is preferred. The number of siloxane units in the organopolysiloxane can be in the range of about 10 to about 10,000; is preferably in the range of about 100 to about 1000; and more preferably is at least about 250. The viscosity of the organopolysiloxane can be at least about 10 centistokes at 23° C. and is preferably in the range of about 1000 to about 1,000,000 centistokes at 23° C. Viscosity is measured by using a Cannon-Fenske TM capillary viscometer according to ASTM D-445-61. When the viscosity is less than about 10 centistokes, there is a tendency towards exudation on the surface of the resulting foam. Preferred organopolysiloxanes are silicone gum and silicone oil.

One formula for a suitable organopolysiloxane can be written as follows:

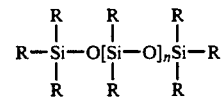

wherein R is hydrogen or an unsubstituted or substituted monovalent hydrocarbyl radical; each R is the same or different; and n is at least about 10.

R is exemplified by hydrogen, alkyl such as methyl, ethyl, n-propyl, isopropyl, n-butyl, isobutyl, and tert-butyl, and phenyl. One or more of the R radicals can also be unsaturated or contain, for example, a vinyl group or a hydroxy group. The subscript n can be in the range of about 10 to about 10,000, is preferably in the range of about 100 to 1000, and more preferably at least about 250.

A preferred organopolysiloxane can have the following recurring unit:

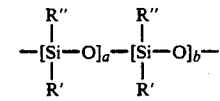

wherein R' is a monovalent unsaturated aliphatic group; R" is an unsubstituted or substituted monovalent saturated aliphatic or aromatic group; each R" is the same or different; 0 < or equal to a < 1; 0.5 < b < 3; and 1 < a+b < 3. The subscript a is preferably about 0.0004 to about 0.06. The subscript b is preferably about 1 to about 2.

An example of a specific recurring unit wherein a+b=2; a=0.1; and b=1.9 follows:

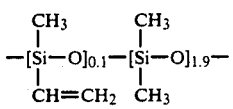

R' can be a vinyl or other alkenyl group having 2 to 10 carbon atoms and R" can be an alkyl such as methyl, ethyl, or propyl; an aryl such as phenyl or tolyl; or a cycloalkyl such as cyclohexyl or cyclobutyl. Substituents are exemplified by halogen, cyano, and mercapto radicals.

The organic peroxides, which can be used in this invention for crosslinking, preferably have a decomposition temperature in the range of about 100 to about 220° C. and about a 10 minute half life. Suitable organic peroxides are as follows (the decomposition temperature in °C. is given in parentheses):

Succinic acid peroxide (110), benzoyl peroxide (110), t-butyl peroxy-2-ethylhexanoate (113), p-chlorobenzoyl peroxide (115), t-butyl peroxyisobutyrate (115), t-butyl peroxyisopropyl carbonate (135), t-butyl peroxylaurate (140), 2,5-dimethyl-2,5-di(benzoyl peroxy)hexane (140), t-butyl peroxyacetate (140), di-t-butyl peroxyphthalate (140), t-butyl peroxymaleate (140), cyclohexanone peroxide (145), t-butyl peroxybenzoate (145), dicumyl peroxide (150), 2,5-dimethyl-2,5-di(t-butyl peroxy)hexane (155), t-butyl cumyl peroxide (155), t-butyl hydroperoxide (158), di-t-butyl peroxide (160), 2,5-dimethyl-2,5-di (t-butyl peroxy) hexene-3 (170), di-isopropylbenzene hydroperoxide (170), p-methane hydroperoxide (180), and 2,5-dimethyl hexane-2,5-hydroperoxide (213).

For each 100 parts by weight of ethylene/vinyl acetate copolymer, the proportions of components are about as follows:

| Component | Parts by Weight | |
|---|---|---|
| | broad | preferred |
| (ii) organopolysiloxane | 0.1 to 10 | 1 to 5 |
| (iii) organic peroxide | 0.001 to 1 | 0.002 to 0.010 |

The components are heat-kneaded together at a temperature of at least about 160° C., and preferably about 180° C. to about 200° C., in kneading apparatus such as a Banbury TM mixer or a twin-screw extruder. The heat-kneading is continued until the melt index of the combination is in the range of about 0.05 to about 8.0 grams per 10 minutes.

Additives such as crosslinking assistants, lubricants, antioxidants, UV absorbers, heat stabilizers, flame retardants, anti-static agents, anti-fungus agents, deodorants, coloring agents, inorganic fillers, and rubbers can be introduced into the process in conventional amounts if desired.

The invention is illustrated by the following examples.

EXAMPLES 1 to 13

(i) The melt index of the pellets is measured in accordance with JIS (Japanese Industrial Standard) K-6760.

(ii) The tensile strength, elongation, and secant modulus of the pressed sheets are measured in accordance with JIS K-6760.

(iii) The workability of inflated tubular films is evaluated as follows:

A=easily formed
B=not easily formed
C=not capable of being formed (iv) The blocking of inflated tubular films is evaluated as follows:

A=no blocking (tube can be opened easily)
B=blocking (tube cannot be opened easily)

(v) The heat resistance of inflated tubular films is evaluated as follows:

The films are placed in a chamber at 200° C. and removed from the chamber after 10 minutes.

A=film did not change
B=film changed. Some could not be formed into film, and were tested as sheets.

(vi) The gel content of the inflated tubular films is evaluated as follows:

B=film having a gel in which the longest diameter is more than 0.5 millimeter
A=film free from the above described gel 100 parts by weight of EVA containing 35 percent by weight vinyl acetate and having a melt index of 35 g/10 min; 1 part by weight silicone gum containing 1 percent by weight methyl vinyl silicone and have a viscosity of 300,000 centistokes at 23° C. and 4600 siloxane units; 0.02 part by weight of an antioxidant, tetrakis [methylene (3,5-di-tert-butyl-4-hydroxyhydrocinnamate)]methane are kneaded for 15 minutes at 180° C. in a Banbury TM mixer and the mixture is pelletized in an extruder. The melt index of the modified EVA is measured and a portion of the pellets is formed into a sheet in a heat-pressing machine at 180° C. and 200 kilograms per square centimeter. The Properties of the sheet are evaluated.

Another portion of the pellets is formed into a 30 micron thick tubular film in an inflated film extruder. The extrusion temperature is 120° C. Workability, blocking, heat resistance, and gel content are then evaluated.

Examples 2 and 3 are carried out in the same manner as example 1 except that the amount of the silicone gum is changed.

Examples 4 to 6 are carried out in the same manner as examples 1 to 3, respectively, except that 0.005 part by weight of an organic peroxide is added. The organic peroxide is 2,5-dimethyl-2,5-di(t-butylperoxy)hexyne-3.

Example 7 is carried out in the same manner as example 1 except that an EVA containing 20 percent by weight vinyl acetate and having a melt index of 20 grams/10 minutes is used.

Example 8 is carried out in the same manner as example 1 except that an EVA without silicone gum is used.

Example 9 is carried out in the same manner as example 1 except that 0.05 part silicone gum is used.

Example 10 is carried out in the same manner as example 1 except that 10 parts by weight of silicone gum are used and 0.05 part of the organic Peroxide used in example 4 is added. The melt index is too low to form the EVA into an inflated tubular film.

Examples 11 to 13 are carried out in the same manner as example 1 except that the silicone gum is not used, but the organic peroxide of example 4 is added in examples 11 and 13. When the organic Peroxide is added in a small amount (example 11), the Properties of the EVA are not improved. When the amount of the organic peroxide is increased (example 13), the melt index of the EVA is satisfactory, but undesirable gels appear.

Variables and the results of examples 1 to 13 are set forth in the Table.

TABLE

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Component (parts by weight): | | | | | | | | | | | | | |
| EVA (35% by wt VA) | 100 | 100 | 100 | 100 | 100 | 100 | — | 100 | 100 | 100 | 100 | — | — |
| EVA (20% by wt VA) | — | — | — | — | — | — | 100 | — | — | — | — | 100 | 100 |
| Silicone gum | 1 | 3 | 5 | 1 | 3 | 5 | 3 | — | 0.05 | 10 | — | — | — |
| Organic peroxide | — | — | — | 0.005 | 0.005 | 0.005 | — | — | — | 0.05 | 0.005 | — | 0.5 |
| Antioxidant | 0.02 | 0.02 | 0.02 | 0.02 | 0.02 | 0.02 | 0.02 | 0.02 | 0.02 | 0.02 | 0.02 | 0.02 | 0.02 |
| Properties: | | | | | | | | | | | | | |
| Melt index (g/10 min) | 1.3 | 0.70 | 0.21 | 0.53 | 0.27 | 0.09 | 0.39 | 35 | 28 | 0.00 | 7.9 | 20 | 0.82 |
| Tensile strength (kg/cm$^2$) | 180 | 190 | 173 | 186 | 210 | 153 | 169 | 90 | 92 | 116 | 102 | 100 | 127 |
| Elongation (%) | 870 | 830 | 680 | 850 | 810 | 660 | 710 | 880 | 880 | 600 | 880 | 800 | 530 |
| Secant modulus (%) | 80 | 82 | 85 | 81 | 86 | 86 | 210 | 75 | 76 | 97 | 77 | 300 | 250 |
| Workability | A | A | A | A | B | B | A | C | C | C | C | C | A |
| Blocking | A | A | A | A | A | A | A | — | — | — | — | — | A |
| Heat resistance | A | A | A | A | A | A | A | B | B | B | B | B | A |
| Gel | A | A | A | A | A | A | A | — | — | — | — | — | B |

We claim:

1. A process comprising mixing:
   (i) a copolymer of ethylene and vinyl acetate containing about 20 to about 50 percent by weight vinyl acetate based on the weight of the copolymer; and, for each 100 parts by weight of copolymer,
   (ii) about 1 to about 5 parts by weight of an organopolysiloxane having a viscosity of at least about 10 centistokes at 23° C.; and, optionally,
   (iii) about 0.001 to about 1 part by weight of an organic peroxide
   at a temperature of at least about 160° C. for a sufficient length of time to provide the mixture with a melt index of about 0.05 to about 8.0 grams per 10 minutes.

2. The process defined in claim 1 wherein the copolymer contains about 30 to about 40 percent by weight vinyl acetate.

3. The process defined in claim 1 wherein the organopolysiloxane has about 10 to about 10,000 siloxane units.

4. A process comprising mixing:
   (i) a copolymer of ethylene and vinyl acetate containing about 30 to about 40 percent by weight vinyl acetate based on the weight of the copolymer; and, for each 100 parts by weight of copolymer,
   (ii) about 1 to about 5 parts by weight of an organopolysiloxane having a viscosity of about 10 to about 10,000 centistokes at 23° C. and about 250 to about 10,000 siloxane units; and, optionally,
   (iii) about 0.002 to about 0.010 part by weight of an organic peroxide
   at a temperature in the range of about 180° C. to about 200° C. for a sufficient length of time to provide the mixture with a melt index of about 0.05 to about 8.0 grams per 10 minutes.

5. The process defined in claim 3 wherein the organopolysiloxane has a viscosity of about 1,000 to about 1,000,000 centistokes at 23° C.

6. The process defined in claim 1 wherein the organic peroxide is present.

7. The process defined in claim 6 wherein the organic peroxide is present in an amount of about 0.002 to about 0.010 part by weight.

8. The process defined in claim 1 wherein the temperature is in the range of about 180° C. to about 200° C.

* * * * *